US008543813B2

United States Patent
Feng et al.

(10) Patent No.: US 8,543,813 B2
(45) Date of Patent: Sep. 24, 2013

(54) METHOD AND APPARATUS TO IMPLEMENT VALID MOBILE TICKET TRANSFER

(75) Inventors: Chen Hua Feng, Beijing (CN); He Yuan Huang, Beijing (CN); Xiao Xi Liu, Beijing (CN); Bin Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 12/892,996

(22) Filed: Sep. 29, 2010

(65) Prior Publication Data

US 2011/0078440 A1    Mar. 31, 2011

(30) Foreign Application Priority Data

Sep. 29, 2009  (CN) .......................... 2009 1 0175687

(51) Int. Cl.
*H04L 29/06* (2006.01)

(52) U.S. Cl.
USPC ........... 713/160; 713/162; 713/167; 713/170; 713/171; 713/187; 726/9; 726/10; 726/26; 726/27; 726/28; 726/29; 726/30; 726/31; 726/32; 726/33; 380/255; 380/259; 380/260; 705/50; 705/51; 705/57; 705/59; 705/64; 705/65; 705/66; 705/67

(58) Field of Classification Search
USPC ........... 726/26–33, 9–10; 713/188, 159–181; 713/187; 705/50–59, 64–67; 380/255–263
See application file for complete search history.

(56) References Cited

U.S. PATENT DOCUMENTS

| | | | |
|---|---|---|---|
| 6,842,741 B1 * | 1/2005 | Fujimura | 705/59 |
| 7,207,060 B2 | 4/2007 | Immonen et al. | |
| 7,392,226 B1 * | 6/2008 | Sasaki et al. | 705/64 |
| 2004/0196981 A1 * | 10/2004 | Nakano et al. | 380/280 |

(Continued)

FOREIGN PATENT DOCUMENTS

| | | |
|---|---|---|
| CN | 1653751 A | 8/2005 |
| EP | 1439495 A1 | 7/2004 |

OTHER PUBLICATIONS

TTP: Secure ACID Transfer Protocol for Electronic Ticket between Personal Tamper-proof Devices by Kuramitsu et al; Publisher: IEEE; Year: 2000.*
On Designing a Flexible E-Payment System with Fraud Detection Capability by Leung et al; Publisher: IEEE; Year: 2004.*
Distributed Digital-Ticket Management for Rights Trading System by Matsuyama et al; Publisher: ACM; Year: 1999.*

(Continued)

*Primary Examiner* — Madhuri Herzog
(74) *Attorney, Agent, or Firm* — Jon A. Gibbons; Fleit Gibbons Gutman Bongini & Bianco PL (57) ABSTRACT

Computer-implemented methods and apparatus to perform a valid transfer of an electronic mobile ticket on a mobile device by a ticketing application system of a ticket processing center. One method includes: receiving a first electronic message from a first user, where the first message includes an encrypted electronic mobile ticket and a mobile device number of a second user, and where the electronic mobile ticket is encrypted with a key shared between the first user and the ticketing application system; decrypting the encrypted electronic mobile ticket; generating an electronic mobile ticket encrypted with a key shared by the ticketing application system and the second user; and transmitting a second electronic message that includes the electronic mobile ticket encrypted with the key shared between the ticketing application system and the second user to a mobile device of the second user.

19 Claims, 7 Drawing Sheets

(56) References Cited

U.S. PATENT DOCUMENTS

| | | | |
|---|---|---|---|
| 2005/0240418 A1 | 10/2005 | Chappuis | |
| 2006/0116968 A1* | 6/2006 | Arisawa | 705/67 |
| 2007/0260543 A1 | 11/2007 | Chappuis | |
| 2008/0052192 A1 | 2/2008 | Fisher | |
| 2008/0071637 A1 | 3/2008 | Saarinen et al. | |
| 2008/0161027 A1* | 7/2008 | Benco et al. | 455/466 |
| 2008/0223940 A1 | 9/2008 | Lee et al. | |
| 2009/0030744 A1 | 1/2009 | Yamada | |
| 2009/0125429 A1 | 5/2009 | Takayama | |
| 2009/0268912 A1* | 10/2009 | Nakae | 380/270 |

OTHER PUBLICATIONS

Tripathi, et al., "Algorithms for validating E-tickets in mobile computing environment," Information Sciences, vol. 179, Issue 11, May 13, 2009, pp. 1678-1693.

Chang, et al., "A Secure E-coupon System for Mobile Users," IJCSNS International Journal of Computer Science and Network Security, vol. 6 No. 1, Jan. 2006.

Me, G., "An Asset Framework of M-ticketing," Proceedings of the 4th IASTED International Multi-Conference Wireless and Optical Communications, Jul. 8-10 2004.

\* cited by examiner

METHOD AND APPARATUS TO IMPLEMENT VALID MOBILE TICKET TRANSFER

CROSS-REFERENCE TO RELATED APPLICATIONS

This application claims priority under 35 U.S.C. §119 to Chinese Patent Application No. 200910175687.1 filed Sep. 29, 2009, the entire contents of which are incorporated by reference herein.

BACKGROUND OF THE INVENTION

1. Field of the Invention

The present invention relates to mobile ticketing, and more particularly, to a method and apparatus to implement a valid mobile ticket transfer.

2. Description of the Related Art

Mobile ticketing refers to the process of when a customer uses a mobile phone or other mobile devices to book, pay, obtain and check a ticket. It represents an ever-increasing emerging market. Mobile tickets include transportation mobile tickets, sports mobile tickets, entertainment and events mobile tickets and the like. Compared with traditional tickets that are printed on paper, electronic mobile tickets have the advantages of saving ticket printing and mailing costs, improving a customer's convenience, and reducing infrastructure costs.

The delivery of tickets to mobile devices is typically made by text messaging or by picture messaging. In text messaging, as an example, a text message that includes the ticket number can be delivered to a mobile device in the manner of SMS or WAP Push. Ticket checking is performed by a manual visual checking or optical character recognition (OCR).

In picture messaging, as an example, a message that includes a two-dimensional barcode image can be transmitted to a mobile device in the manner of SMS or MMS. In such a manner, the image in the message is scanned by a laser scanner or a camera-based imager and is decoded into a ticket ID.

The file or image message transmitted in the above manners can be received and processed either by a general-purpose mobile application system (e.g., an existing text or image message receiving client), or by a dedicated mobile application system.

In the existing mobile ticketing systems, checking mobile tickets mainly depends on an OCR or other image photographic devices. Therefore, the SMS/MMS message per se is the unique evidence that proves ticket ownership. Since the SMS/MMS message can be forwarded to others, if the ticket holder forwards the related SMS/MMS message to many other people, then it is difficult to determine which receiver should be regarded as the valid holder.

A current solution is to embed the buyer's identity information into the ticket. However, when the scanner identifies the ticket information during the ticket checking process, it shows the buyer's identity information, and the buyer is required to show his/her identity card to prove that he/she is the legitimate holder of the ticket. Such a solution will not only bring inconvenience to the checking and use of the ticket, making the ticket checking process slower, but also is inconvenient for a valid transfer of the ticket.

SUMMARY OF THE INVENTION

According to one aspect of the present invention, a computer-implemented method is provided for performing a valid transfer of an electronic mobile ticket on a mobile device by a ticketing application system of a ticket processing center. The method includes: receiving a first electronic message from a first user, where the first message includes an encrypted electronic mobile ticket and a mobile device number of a second user, and where the electronic mobile ticket is encrypted with a key shared between the first user and the ticketing application system; decrypting the encrypted electronic mobile ticket; generating an electronic mobile ticket encrypted with a key shared by the ticketing application system and the second user; and transmitting a second electronic message that includes the electronic mobile ticket encrypted with the key shared between the ticketing application system and the second user to a mobile device of the second user.

In another aspect of the present invention, a computer-implemented method is provided for performing a valid transfer of an electronic mobile ticket on a mobile device by a ticketing application of a ticket processing center that includes: acquiring an electronic message, where the electronic message includes an encrypted electronic mobile ticket to be transmitted from a first user to a second user, and where the electronic mobile ticket is encrypted with a key shared by the first user and the ticketing application system; modifying a target receiver of the electronic message in the ticketing application system; adding a mobile device number of the second user into the electronic message; and transmitting the message that includes the encrypted electronic mobile ticket and the mobile device number of the second user to the ticketing application system to allow the ticketing application system to implement a valid transfer of the electronic mobile ticket.

In yet another aspect of the present invention, a computer-implemented apparatus is provided for performing a valid transfer of an electronic mobile ticket on a mobile device by a ticketing application system of a ticket processing center. The apparatus includes: a receiving module for receiving a first electronic message from a first user, where the first electronic message includes an encrypted electronic mobile ticket and a mobile device number of a second user, and where the electronic mobile ticket is encrypted with a key shared between the first user and the ticketing application system; a decryption module for decrypting the encrypted electronic mobile ticket; a generation module for generating an electronic mobile ticket encrypted with a key shared by the ticketing application system and the second user; and a transmission module for transmitting a second electronic message that includes the electronic mobile ticket encrypted with the key shared between the ticketing application system and the second user to a mobile device of the second user.

In still another aspect of the present invention, a computer-implemented apparatus is provided for performing a valid transfer of an electronic mobile ticket on a mobile device by a ticketing application system of a ticket processing center that includes: an acquisition module for acquiring an electronic message, where the electronic message includes an encrypted electronic mobile ticket to be transmitted from a first user to a second user, and where the electronic mobile ticket is encrypted with a key shared by the first user and the ticketing application system; a modifying module for modifying a target receiver of the electronic message in the ticketing application system; an editing module for adding a mobile device number of the second user into the electronic message; and a transmission module for transmitting the electronic message that includes the encrypted electronic mobile ticket and the mobile device number of the second user to the ticketing application system to allow the ticketing application system to implement a valid transfer of the electronic mobile ticket.

DETAILED DESCRIPTION OF PREFERRED EMBODIMENTS

The embodiments of the present invention will now be described with reference to the accompanying drawings. In the following description, numerous details are described to enable the present invention to be fully understood. However, it is obvious to those skilled in the art that the realization of the present invention can exclude some of these details. In addition, it should be appreciated that the present invention is not limited to the described specific embodiments. In contrast, it is contemplated to implement the present invention by using any combination of the following features and elements, no matter whether they involve different embodiments or not. Therefore, the following aspects, features, embodiments and advantages are only illustrative, rather than elements or limitations of the appended claims, unless explicitly stated otherwise in the claims.

The present invention involves encrypting the mobile ticket by a ticket processing center, which can only be decrypted by the target mobile application system. When the ticket is transferred, the telephone number of the receiver is modified by the mobile application system, so that the transferred ticket is sent to the ticket processing center. The ticket processing center decrypts the received ticket and generates a new encrypted ticket for the new mobile user.

Figure 1:
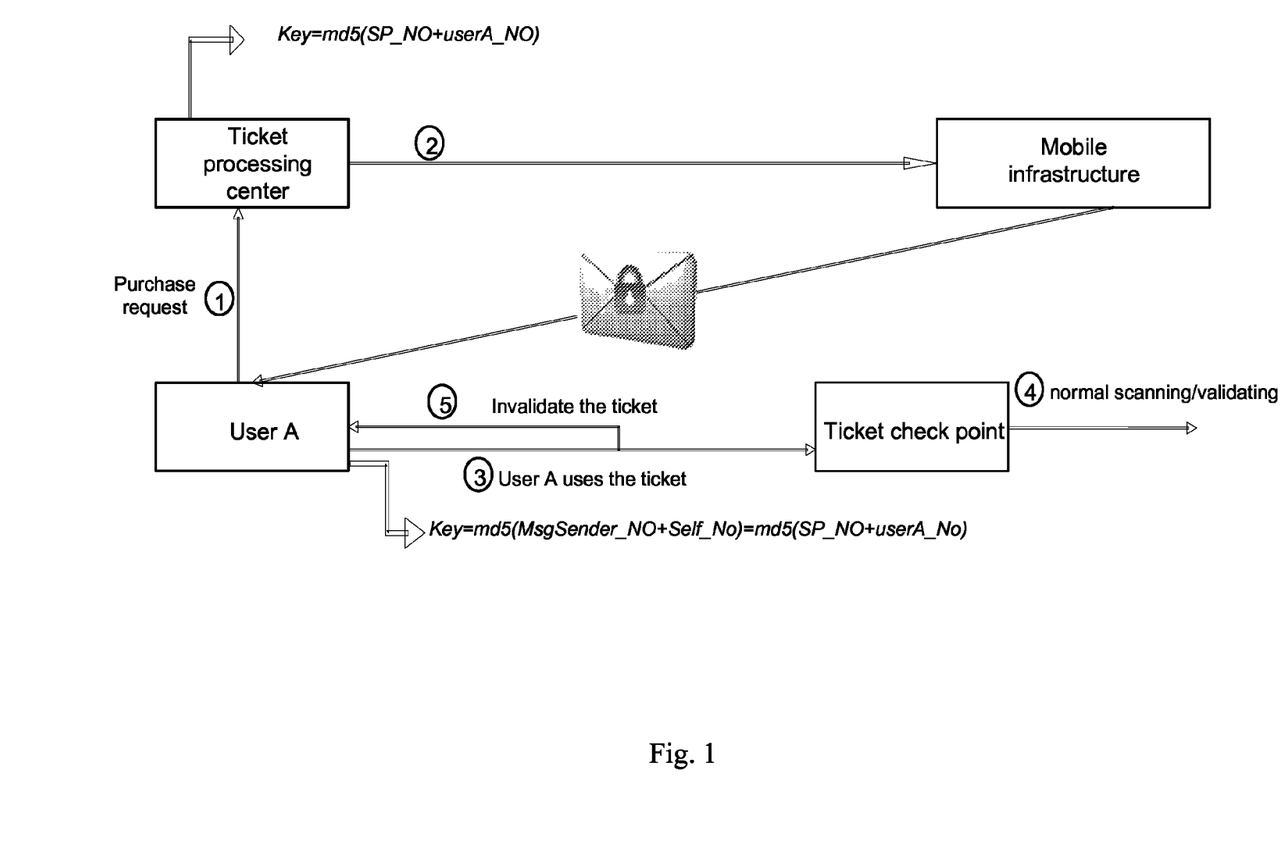
FIG. 1 schematically illustrates a ticket purchase and use process according to an embodiment of the present invention.

Referring to FIG. 1, the schematic illustration shows a ticket purchase and a use process according to an embodiment of the present invention. As shown, in step 1, the user A issues a purchase request to the ticket processing center. The ticket processing center is an agency for issuing tickets, and can be a ticket service provider (SP) or an independent agency for providing ticket issuing services for a number of ticket service providers.

In step 2, the ticket processing center transmits the encrypted ticket to the mobile device of user A, e.g., a mobile telephone, through the mobile infrastructure. The ticket processing center can transmit the encrypted ticket in the form of a SMS or MMS message, i.e., including the ticket in the SMS or MMS message. As known by those skilled in the art, the mobile infrastructure usually includes devices like mobile phone base stations and SMS centers. In addition, as known by those skilled in the art, before transmission, the message in the text form will be encoded into a binary code format, and after receipt, the message of the binary code form will be decoded into the text format.

In the embodiment of the present invention, the ticket processing center can encrypt the ticket by a symmetric encryption algorithm, and the key is shared between the ticket processing center and the mobile ticket program of the user A.

Many key generation methods can be used to generate the key. For example, one key generation method can be based on the information commonly known by the ticket processing center and the mobile application system of a specific user, e.g., the telephone number of the sender and the telephone number of the receiver; and the key generation formula can be Key=md5(SP_No+userA_No). Of course, as known by those skilled in the art, the key generation formula can also use other encryption algorithm besides md5, e.g., HMAC, etc.

As another example, the ticket processing center can generate and provide a unique number (e.g., a register number) for a specific user when the user downloads or installs the mobile application system. Then, the unique register number will become the information commonly known by the ticket processing center and the mobile application system of the specific user, and a key may be generated by the information.

Another type of key generation method can be, when each mobile application system is downloaded or installed, the user is required to register a password with the ticket processing center. The password is only known by the ticket processing center and the user, and thus it can be used to generate a shared key. Another key generation method can be based on a dynamic key generation algorithm, e.g., Diffie-Hellman, etc.

In other aspects of the present invention, the public key encryption algorithm can be used to encrypt the ticket. For example, the ticket processing center uses a public key of the specific user to encrypt the ticket, so that only the specific user can use his/her private key to decrypt the ticket.

In step 3, the user A uses the ticket, i.e., checks the ticket at the ticket check point. Since the mobile application system knows the correct key, it can decrypt successfully. For example, the mobile application system can use the telephone number of the message sender and the its own telephone number, that is, the number of ticket processing center and the number of the user A, to generate a key for decryption by the key generation formula, Key=md5(MsgSender_No+Self_No)=md5(SP_NO+userA-No). Of course, the mobile application system can also use other methods to generate or get the correct key.

In step 4, the checking device at the ticket check point scans or validates the decrypted ticket. The scanning and validation method can be the same as that in the prior art. For example, the checking device can determine whether the ticket is a valid ticket by comparing the scanned ticket information with the ticket repository in the ticket processing center, so as to implement validating the ticket. Then, the checking device can transmit the information of the scanned and validated ticket to the ticket processing center, and mark the status of the ticket as invalid in the ticket repository for recording the issued tickets and their status information, for future validation.

In an optional step 5, when the user has used the ticket, the mobile application system can set a flag of used or invalid for the ticket.

Figure 2:
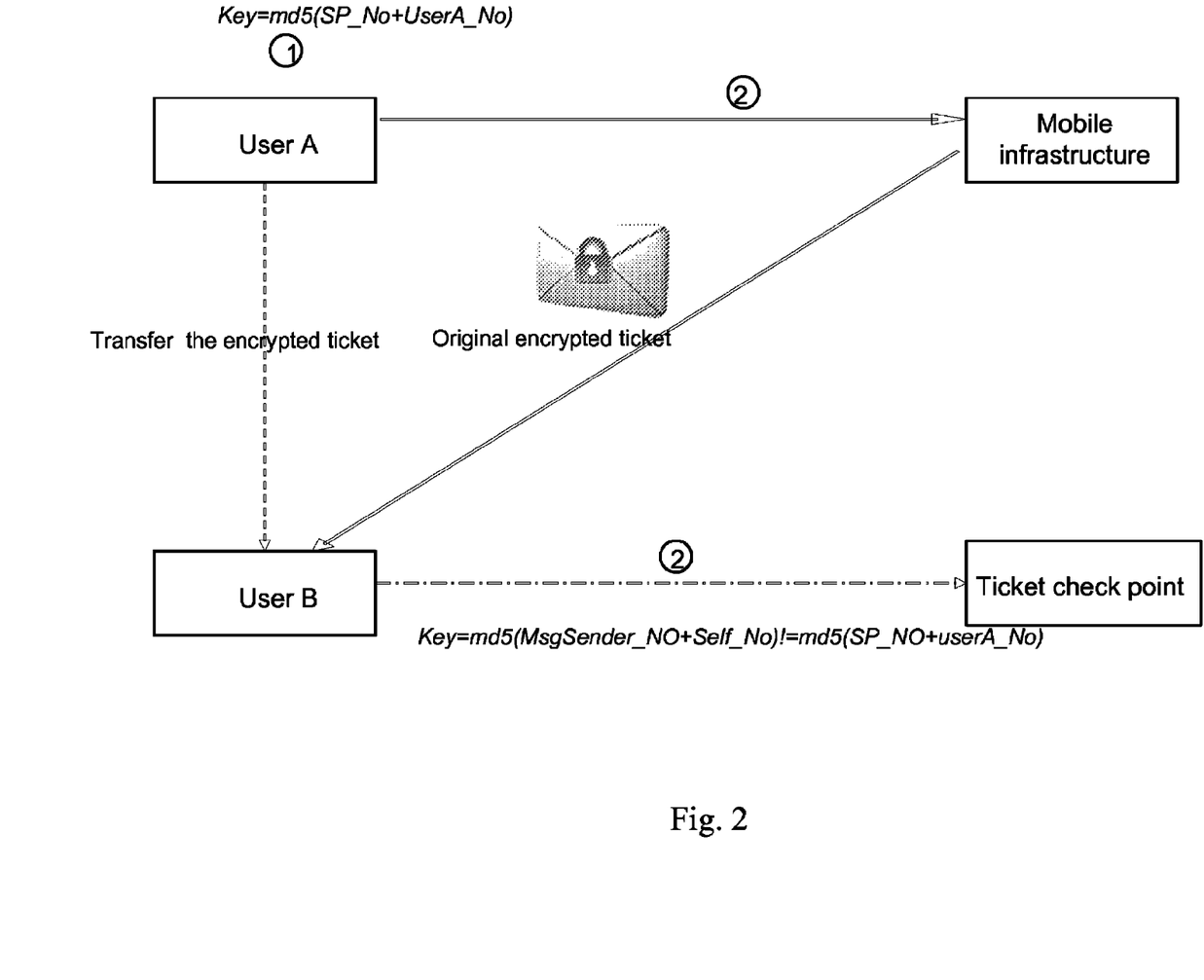
FIG. 2 schematically illustrates the principle of preventing an invalid ticket transfer according to an embodiment of the present invention.

Referring to FIG. 2, a schematic illustration shows the prevention of an invalid ticket transfer according to an embodiment of the present invention.

As shown, in step 1, if the user A attempts to make an invalid transfer of the encrypted ticket to the user B (e.g., directly transmitting the encrypted ticket to the user B by bypassing the ticket transfer mechanism of the present application system as described below), the encrypted ticket is transmitted to the mobile device of the user B through the mobile infrastructure. The ticket was encrypted by the key shared between the ticket processing center and the mobile application system of the user A. For example, the key can be generated by the formula, Key=md5(SP_No+UserA_No), where the SP_No is the telephone number of the ticket processing center, and UserA_No is the telephone number of the user A.

In step 2, the mobile application system of the user B tries to decrypt the encrypted ticket, so as to use it at the ticket check point. However, since the key of the encrypted ticket is shared between the user A and the ticket processing center, the mobile application system of the user B cannot use the key. Therefore, the mobile application system of the user B cannot decrypt or use the ticket. For example, the mobile application system of the user B can attempt to generate the key according to the telephone number of the message sender and its own telephone number; however, here, the telephone number of the message sender is the telephone number of the user A, its own telephone number is the telephone number of the user B, and the two does not equal to the telephone number of the ticket processing center and the telephone number of the user A which were used originally when generating the key for encrypting the ticket, that is:

$$Key=md5(MsgSender\_No+Self\_No)!=md5(SP\_No+userA\-No).$$

Therefore, the generated key cannot decrypt the encrypted ticket. As such, the ticket holder is prevented from invalidly transferring his ticket.

Figure 3:
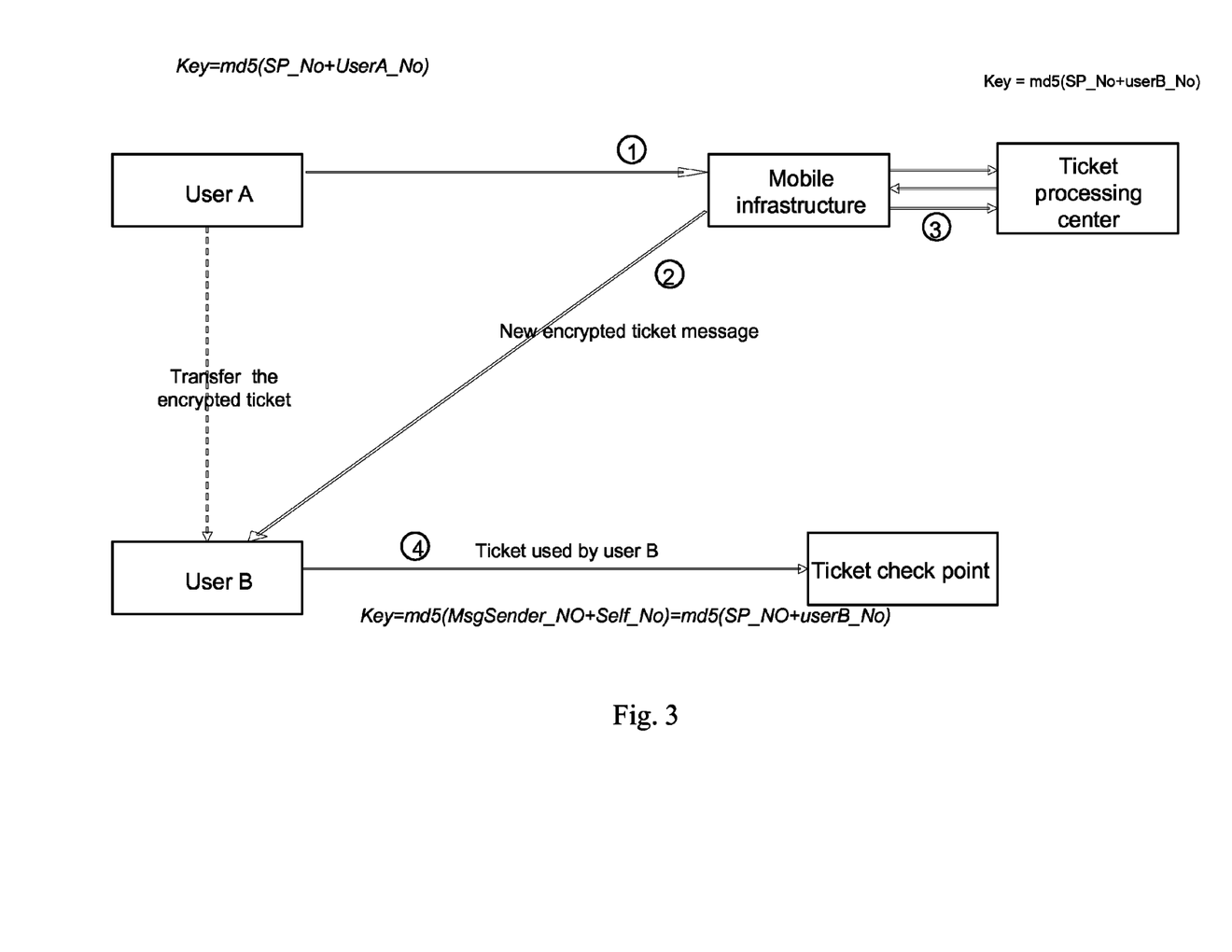
FIG. 3 schematically shows a ticket transfer process according to an embodiment of the present invention.

FIG. 3 shows a ticket transfer process according to an embodiment of the present invention.

As shown, in step 1, in order to transfer the encrypted ticket to user B, user A transmits the message including the encrypted ticket to the user B, where the mobile application system of the user A modifies the receiver number from the telephone number of the user B to the telephone number of the ticket processing center, and encodes the telephone number of the user B together with the ticket number, by which the message that includes the encrypted ticket and the telephone number of the user B will be sent to the ticket processing center through the mobile infrastructure, rather than directly transmitted to the mobile device of the user B.

Preferably, before transmitting the message, the mobile application system of the user A further encrypts the telephone number of the user B or the message including the telephone number of the user B and the ticket, and the encryption is performed with the key shared between the user A and the ticket processing center. The above modifying, encoding and encryption processes can be automatically performed by the mobile application system of the user A and are transparent to the user A.

After receiving the above message from the user A, the ticketing application system of the ticket processing center performs the following operations.

First, the encrypted ticket from the user A is decrypted and validated. Since the ticketing application system of the ticket processing center knows the key shared between the user A and the ticket processing center, the ticketing application system can decrypt the encrypted ticket from the user A. The ticketing application system may determine whether the decrypted key is a valid ticket by checking the status of the ticket in the ticket repository for maintaining the issued tickets and the respective status information, so as to implement the validation of the ticket.

Then, the ticketing application system of the ticket processing center locks the ticket from the user A which has been decrypted and validated, which can be done by setting the status of the ticket as locked in the ticket repository for maintaining the issued tickets and their status information. During the locked period, the ticket cannot be used.

Next, the ticketing application system of the ticket process center may use the key shared between the ticket processing center and the user B to encrypt the ticket to generate a new encrypted ticket; or a new ticket is generated for the user B first, and then the new ticket is encrypted with the key shared between the ticket processing center and user B, so as to generate a new encrypted ticket.

In step 2, the ticket processing center transmits the generated new encrypted ticket to the mobile device of the user B.

In step 3, the mobile infrastructure (e.g., the SMS center therein) transmits a message receipt from the user B to the ticketing application system of the ticket processing center. Optionally, after the ticketing application system of the ticket processing center receives the message receipt, it invalidates the original ticket from the user A. The ticketing application system can invalidate the ticket by modifying the status of the ticket into invalid in the ticket repository.

In step 4, the user B can use the decrypted new encrypted ticket at the ticket check point. The mobile application system of the user B may use the key shared between it and the ticket processing center to decrypt the new encrypted ticket. For example, the calculation formula of the key can be Key=md5 (MsgSender_No+Self_No)=md5(SP_No+userB_No).

If the mobile telephone user A, after receiving the encrypted mobile ticket from the ticket processing center, first decrypts the mobile ticket by an invalid means, and then transmits the decrypted mobile ticket to other users, an invalid transfer of the mobile ticket may occur multiple times.

Rules of mobile ticketing service can be formulated to indicate which transfers of a decrypted mobile ticket are invalid. When a user decrypts the ticket (regardless of whether this occurs during the ticket checking process or at other times), a flag indicting that the ticket has been used (e.g., text description or other invalid flag to indicate that the ticket has been used) can be added on the ticket by the mobile application system. Then the users receiving the decrypted and transferred ticket can readily detect that the ticket is invalid.

As another example, the mobile application system of the user can be customized such that the system is unable to decrypt after receiving the encrypted mobile ticket, even if it knows the correct key, and only allow the user to view the related information of the ticket; and during the ticket checking process, the ticket processing center transmits a decryption command to the user in the form of a SMS message, etc., and the ticket is decrypted and presented to the ticket checking device at the ticket check point only when the mobile application system of the user receives the decryption command.

Above is described the ticket purchase, use and transfer processes according to an embodiment of the present invention. It should be pointed out that the above description is only an exemplary description of the present invention. For example, the arrangement and the message transmission sequence among the SMS center, the mobile telephone base station and other devices are only exemplary.

Figure 4:
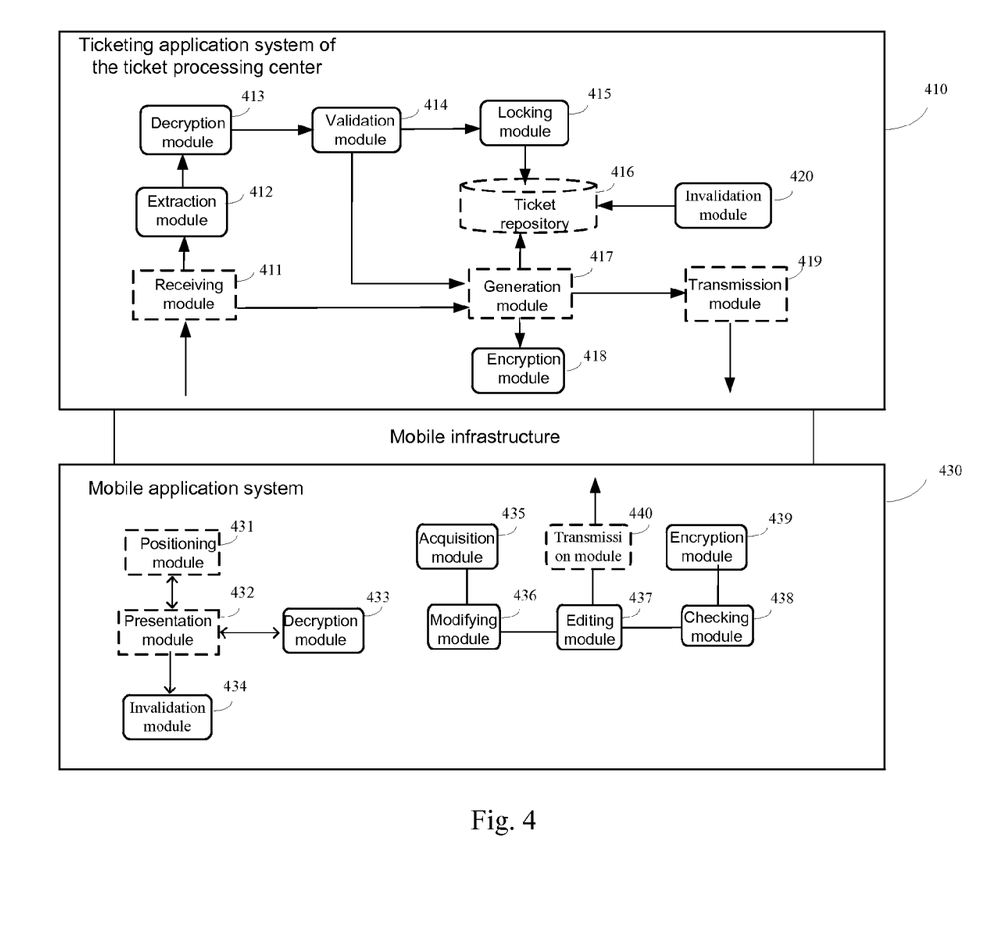
FIG. 4 schematically shows the architecture of a system to implement valid ticket transfer according to an embodiment of the present invention.

Now referring to FIG. 4, the schematic shows the architecture of a computer system that detects a valid ticket transfer according to another embodiment of the present invention;

As shown, the system includes the two parts of the ticketing application system 410 of the ticket processing center, and the mobile application system 430. The ticketing application system 410 of the ticket processing center includes a receiving module 411, an extraction module 412, a decryption mould 413, a validation module 414, a locking module 415, a ticket repository 416, a generation module 417, an encryption module 418, a transmission module 419 and an invalidation module 420. The receiving module 411, the ticket repository 416, the generation module 417, the transmission module 419 may be respective modules in the prior art. The extraction module 412, the validation module 414, the locking module 415, the ticket repository 416, the invalidation module 420 are all optional modules. The system can further include other modules not shown, for example, a key generation module for generating a key for encrypting a mobile ticket. The ticketing application system 410 of the ticket processing center and the mobile application system 430 can communicate with each other through existing mobile infrastructures.

The mobile application system 430 includes a positioning module 431, a presentation module 432, a decryption module 433, an invalidation module 434, an acquisition module 435, a modifying module 436, an editing module 437, a checking module 438, an encryption module 439, a transmission module 440. The positioning module 431, the presentation module 432 and the transmission module 440 can be respective modules in the prior art.

Figure 5:
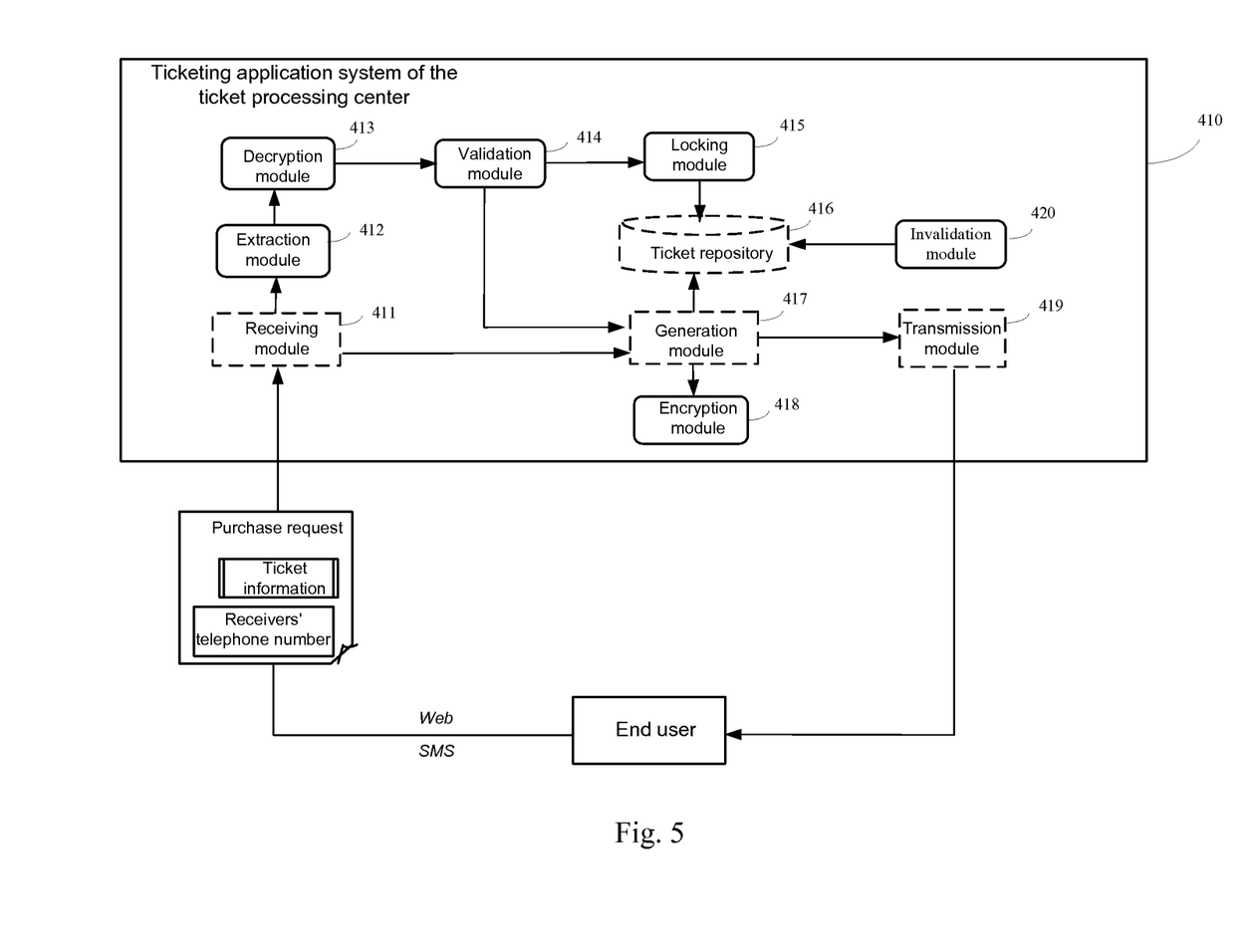
FIG. 5 schematically shows operations of the respective modules of the system to implement valid mobile ticket transfer at the ticket processing center during the purchase process according to an embodiment of the present invention.

Now referring to FIG. 5, it schematically shows operations of the respective modules of the system to detect a valid mobile ticket transfer at the ticket processing center during the purchase process according to the embodiment of the present invention.

As shown, the end user transmits a purchase request to the ticket processing center, the purchase request including related information of the ticket to be purchased by the user, as well as the mobile telephone number of the user. The purchase request can be sent in the form of a Web SMS.

The receiving module 411 in the ticketing application system of the ticket processing center receives the purchase request and transmits it to the generation module 417.

The generation module 417 generates a mobile ticket according to the purchase request and provides it to the encryption module 418 to encrypt, so as to generate a message including the encrypted mobile ticket, and then transmits the message including the encrypted mobile ticket to the transmission module 419, where the encryption module 419 can use a key shared between the end user and the ticket processing center to encrypt the mobile ticket. The key can be generated by a key generation module, which is not shown using any one of the above-described key generation methods, e.g., by using the mobile telephone number of the user included in the purchase request and the telephone number of the ticket processing center.

The generation module 417 can store the generated mobile ticket and its status into the ticket repository 416.

The transmission module 419 can transmit the message including the encrypted mobile ticket to the end user.

Figure 6:
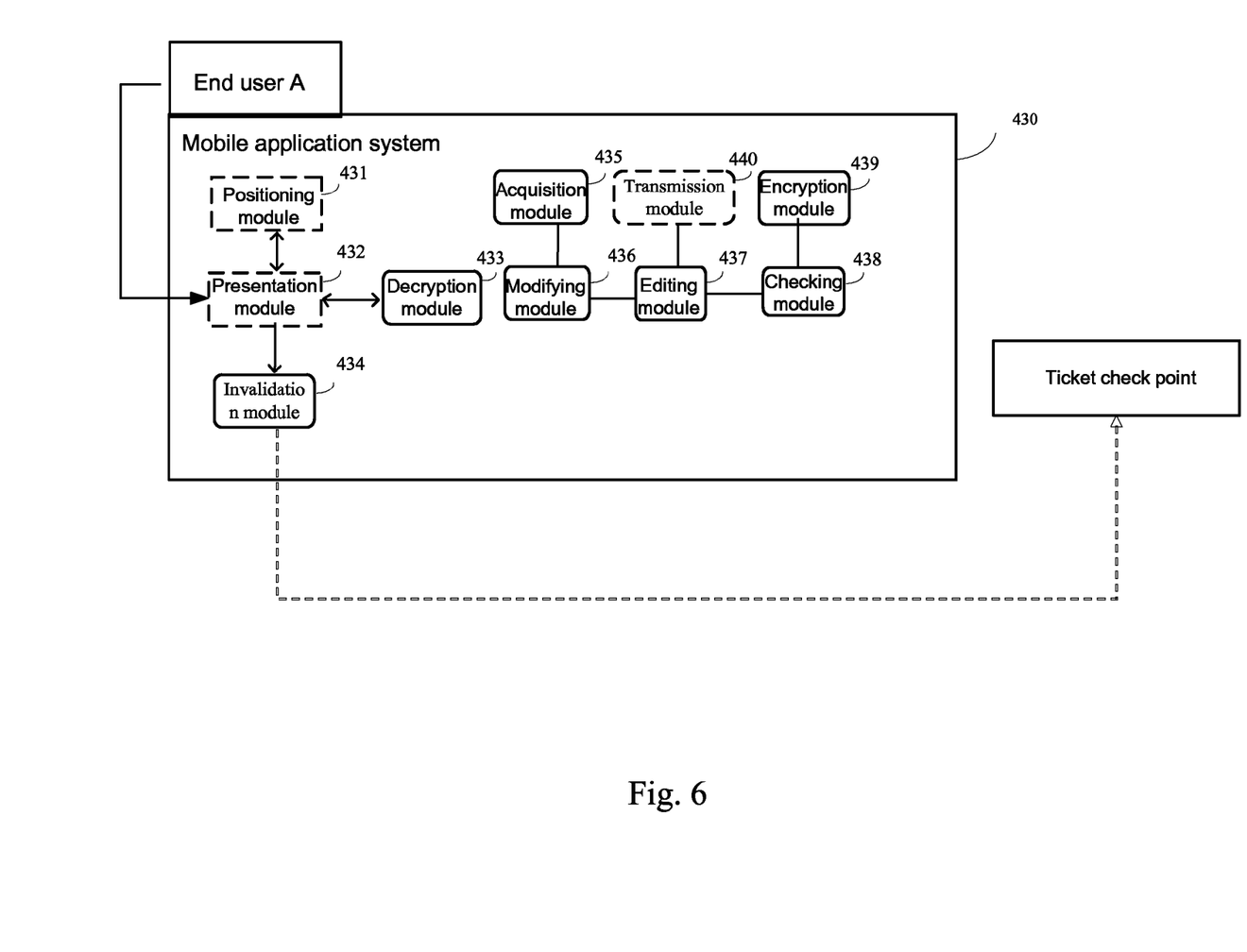
FIG. 6 schematically shows operations of the respective modules of the system to implement valid mobile ticket transfer at mobile application during the ticket checking process according to an embodiment of the present invention.

Now referring to FIG. 6, it schematically shows operations of the modules of the system to detect a valid mobile ticket transfer at the mobile application system during the ticket checking process according to the embodiment of the present invention.

As shown, the end user A issues an instruction for presenting the mobile ticket to the presentation module 432 in the mobile application system 430.

The presentation module 432 issues an instruction for searching the mobile ticket to the positioning module 431, and the positioning module 431 finds the message including the mobile ticket and provides it to the presentation module. For example, the mobile ticket may be transmitted in the form of an MMS message, and it can include a specific flag in its message header to indicate that the message includes a mobile ticket. In this way, the positioning module 431 can find out all the messages including a mobile ticket by looking up the flag in the MMS message inbox of the user's mobile telephone.

The presentation module 432 provides the message including the mobile ticket to the decryption module 433 for decryption. The decryption module 433 can use a key shared between the end user A and the ticket processing center to decrypt the mobile ticket, where the key can be the same as or correspond to the key previously used for encrypting the mobile ticket in the ticket processing center. The key can be generated by a key generation module which is not shown.

The decryption module 433 can provide the decrypted ticket to the presentation module 432. The presentation module 432 can present the decrypted ticket to the ticket checking device at the ticket check point. The ticket checking device can check the decrypted ticket.

After the checking is passed, the ticket can be invalidated by the invalidation module 434 in the mobile application, which can be done by adding or setting a flag of used or invalidated on the ticket.

Figure 7:
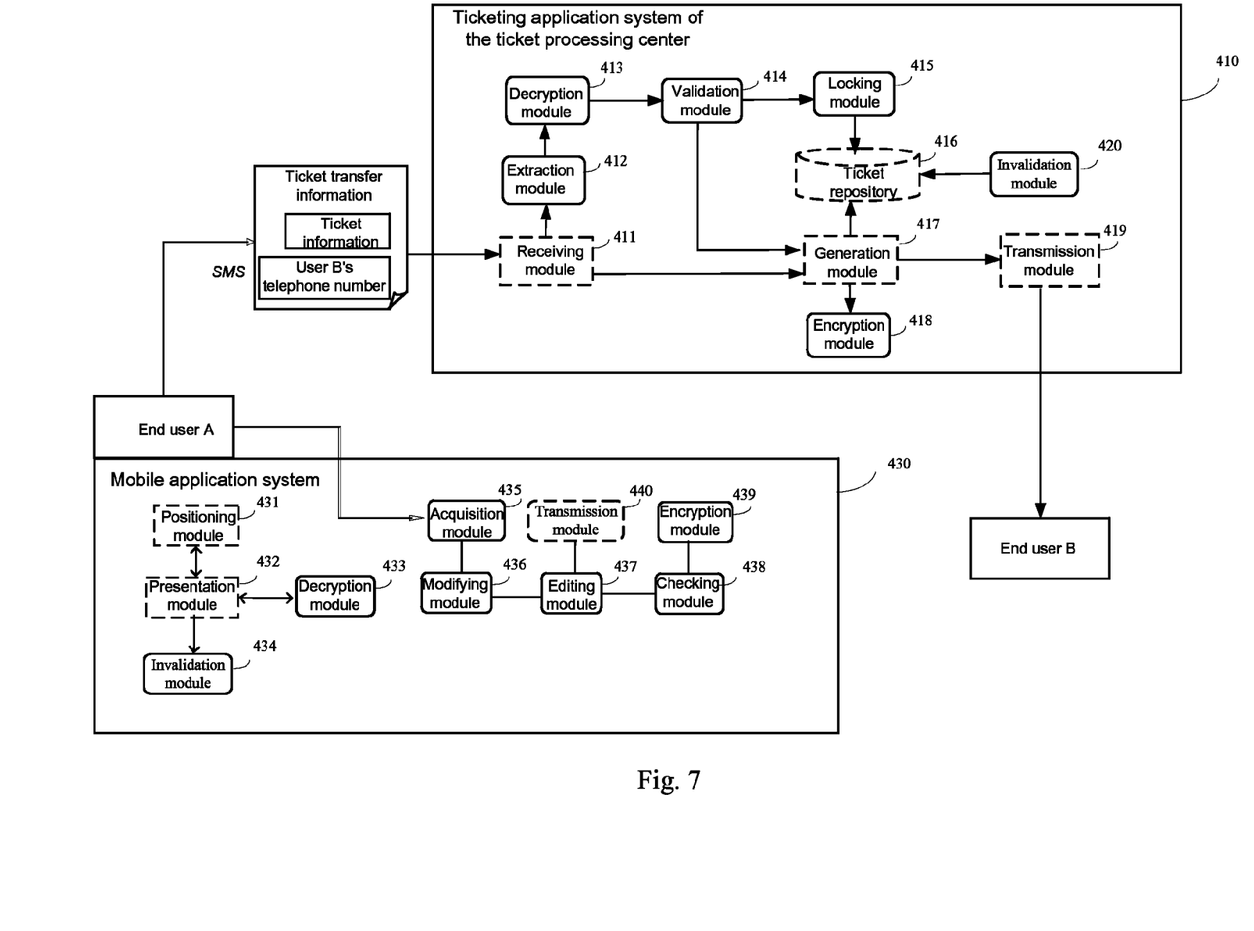
FIG. 7 schematically shows operations of the respective modules of the system to implement valid mobile ticket transfer during the ticket transfer process according to an embodiment of the present invention.

Now referring to FIG. 7, it schematically shows operations of the modules of the system to detect a valid mobile ticket transfer during the ticket transfer process according to the embodiment of the present invention.

As shown, when the user A transmits the message including the mobile ticket to the user B in order to transfer the mobile ticket to the user B, the acquisition module 435 in the mobile application system 430 of the user A can acquire the mobile ticket message. Then, the modifying module 436 can modify the receiver's telephone number in the mobile ticket message from the mobile telephone number of the user B to the telephone number of the ticket processing center, and the editing module 437 may edit the mobile ticket message to embed the mobile telephone number of the user B into the message. The operations of acquisition, modifying the number and the editing can be performed in a manner completely transparent to the user A.

Then, the checking module 438 can check whether the mobile ticket message has a plurality of receivers, and if it does, forbid the transmission of the mobile ticket message, and optionally indicate to the user A that the same mobile ticket cannot be transferred to a plurality of receivers. The checking module 438 can further check whether the mobile ticket includes the flag indicating that the mobile ticket has been transferred, and when the mobile ticket includes the flag, forbid the transmission of the mobile ticket message. In such a situation, whenever the mobile ticket message is successfully transmitted, a flag indicating that the mobile ticket has been transferred should be set in the mobile ticket.

The checking module 438 can also check whether the ticket message has a plurality of receivers, or has been transferred, before the modifying module 436 modifies the receiver number and the editing module 437 edits the ticket message.

Then, the encryption module 439 can use the key shared between the user terminal A and the ticket processing center to encrypt the telephone number of the user B included in the modified and edited mobile ticket message or the entire mobile ticket. The key can be generated by a key generation module (not shown), which can use information commonly known by the user terminal A and the ticket processing center (e.g., the telephone number of the end user A and the telephone number of the ticket processing center) to generate the key, or use other methods described above to generate the key.

Then, the transmission module 440 transmits the modified, edited and encrypted mobile ticket message to the ticket processing center, e.g. in the form of an SMS/MMS message. In the transmitted ticket message, the encrypted ticket information and the mobile telephone number of the user B are included.

After the receiving module 411 in the ticket application system 440 of the ticket processing center receives the ticket message from the end user A, it provides the message to the extraction module 412. The extraction module 412 decodes the encrypted mobile ticket and the mobile telephone number of the user B from the ticket message, and transmits the encrypted mobile ticket to the decryption module 413 for decryption. The decryption module 413 can use the key shared between the user terminal A and the mobile processing ticket to decrypt the mobile ticket, where the key is the same as or corresponds to that which is used for encrypting the ticket message at the mobile application system of the user A. The key can be generated by a key generation module (not shown) or obtained by other means. The validation module 414 can validate the decrypted mobile ticket to verify whether it is a valid mobile ticket, which can be done by looking up the ticket repository 416 for maintaining the issued tickets and their status information.

After the ticket validation, the locking module 415 locks the mobile ticket to make it unusable. The locking module can do this by setting the status of the mobile ticket as locked in the ticket repository 416.

Then, the validation module 414 or another module can transmit the decrypted ticket information and the mobile telephone number of the user B to the generation module 417. The generation module 417 can transmit the decrypted mobile ticket to the encryption module 418 for encryption. The encryption module 418 can use the key shared between the ticket service provider and the user B to encrypt the mobile ticket. The key can be generated by a key generation module (not shown) according to information commonly known by the ticket processing center and the user B (e.g., the telephone numbers of the ticket processing center and the user B), or in other manners described above. Further, the generation module 417 can generate a message including the encrypted mobile ticket.

Then, the generation module 417 can store the mobile ticket and its status into the ticket repository, and transmit the generated message including the new encrypted mobile ticket to the transmission module 419.

The transmission module 419 can transmit the ticket message to the user B. When the ticketing application system 410 receives a message receipt from the user B, the status of the original mobile ticket can be modified to be invalid by the invalidation module 420. This can be done by modifying the status of the original mobile ticket as invalid in the ticket repository.

Above is described, the modules and their operations in the system to detect a valid ticket transfer according to the embodiment of the present invention by referring to the accompanying drawings. It should be pointed out that the above description and the illustration are only exemplary. In other embodiments of the present invention, the system can have more, less or different modules, and the operations of the modules and the relationships therebetween can be different from that is described and illustrated.

In some embodiments of the present invention, the mobile application system 430 can exclude one or more of the positioning module 431, the presentation module 432, the decryption module 433, the invalidation module 434, the checking module 438 and the encryption module 439. In other embodiments of the present invention, the mobile application system 430 can further include some other modules not shown in the drawings, e.g., a receiving module for receiving a decryption command from the ticket processing center. In such embodiments of the present invention, the decryption module 433 can decrypt the mobile ticket in response to the received decryption command.

In some embodiments of the present invention, the ticketing application system 410 of the ticket processing center can exclude one or more of the extraction module 412, the validation module 414, the locking module 415, the ticket repository 416 and the invalidation module 420. In other embodiments of the present invention, the ticketing application system 410 can further include a purchase processor and a transfer request processor for coordinating the operations of the modules so as to process the ticket purchase request or ticket transfer request from the user mobile device respectively, and so on.

All these variations are within the sprit and scope of the present invention. In addition, the names of the modules are specified only for the convenience of convenience, and not limitation to the present invention.

In the foregoing, the symmetric key encryption system is used by example to describe the technical solution of the present invention. However, as can be understood by those skilled in the art, the technical solution of the present invention is also suitable for using, for example, a non-symmetric key encryption system (which includes a public key and a private key).

In the case of using the non-symmetric key encryption system, when the mobile ticket or message is encrypted, the public key of the target receiver of the mobile ticket or the message is used to encrypt the mobile ticket or message, and the target receiver decrypts the mobile ticket or message with his private key after receiving the mobile ticket or message. This can ensure that the mobile ticket or message can only be decrypted or used by its target receiver. In the case of using the non-symmetric key encryption system, in order to make sure that the target receiver of the mobile ticket or the message that the mobile ticket or message is from an expected transmitter, the transmitter can further perform a digital signature to the mobile ticket or message before transmitting the mobile ticket or message, that is, after a hash value of the mobile ticket or message is generated, the transmitter's private key is used to encrypt the hash value to get the digital signature, and then the digital signature is transmitted to the target receiver together with the encrypted mobile ticket or message. After the target receiver receives the encrypted mobile ticket or message and the digital signature, the expected transmitter's public key can be used to decrypt the digital signature, so as to get the original hash value; in the mean time, the same hash algorithm is used to perform hash operation on the received mobile ticket or message to get a hash value. Then, the two hash values are compared with each other, and if the two are equal, this indicates that the mobile ticket or message does come from the expected receiver.

Since the technical solution of the invention uses the key shared between the ticket processing center and the target user to encrypt the mobile ticket, the mobile ticket can only be used by the target user, so that an invalid transfer of the mobile ticket is effectively prevented, and the target user can be sure that the mobile ticket is issued by the ticket processing center. In the mean time, a mechanism of valid transfer of the mobile ticket is provided, where by automatically modifying the target receiver of the mobile ticket transfer message from the target transferred user to the ticket processing center at the mobile application system of the user, and by generating a new encrypted ticket by the ticket processing center to be sent to the target transferred user, the valid transfer of the mobile ticket is facilitated.

In addition, the technical solution of the present invention adds modules for encryption, decryption and transfer processing at the ticket processing center and the mobile application system of the mobile telephone user, without making any modifications to the existing ticket checking mechanism and the terminal as well as the mobile infrastructures, and thus it is a low-cost and non-invasive solution.

Embodiments of the present invention can be implemented in hardware, software, or a combination thereof. The embodiments of the present invention can be implemented in a computer system in a centralized manner, or in a distributed manner, in which, different components are distributed in some interconnected computer system. A computer system or other devices suitable for executing the method described herein are appropriate. A typical combination of hardware and software can be a computer system with a computer program, which when being loaded and executed, controls the computer system to execute the method of the present invention, and constitute the apparatus of the present invention.

The present invention can also be embodied in a computer program product, which can implement all the features of the method described herein, and when being loaded into a computer system, can execute the method.

What is claimed is:

1. A computer-implemented method for performing a valid transfer of an electronic mobile ticket on a mobile device by a ticketing application system of a ticket processing center, said method comprising:
   receiving a first electronic message from a first user, wherein said first electronic message includes an encrypted electronic mobile ticket and a mobile device number of a second user, and wherein said electronic mobile ticket is encrypted with a key shared between said first user and said ticketing application system; decrypting said encrypted electronic mobile ticket;
   generating an electronic mobile ticket encrypted with a key shared by said ticketing application system and said second user;
   transmitting to the mobile device number of the second user, a second electronic message that includes said electronic mobile ticket encrypted with said key shared between said ticketing application system and said second user to a mobile device of said second user, wherein said second message is transmitted using a short message service (SMS) with a flag in a message header to indicate said SMS message includes an encrypted electronic mobile ticket;
   transmitting a decryption command via SMS to said mobile device of said second user to decrypt said electronic mobile ticket encrypted using said key shared between said second user and said ticketing application system; and
   in response to said decryption command presenting on said mobile device of said second user said encrypted electronic mobile ticket, based on said flag being found.

2. The method of claim 1, further comprising:
   validating said decrypted electronic mobile ticket by checking a status information of an issued ticket.

3. The method of claim 1, further comprising:
   locking said encrypted electronic mobile ticket included in said first electronic message to forbid the use of said electronic mobile ticket.

4. A computer-implemented method for performing a valid transfer of an electronic mobile ticket on a mobile device by a ticketing application system of a ticket processing center, said method comprising:
   acquiring an electronic message, wherein said electronic message includes an encrypted electronic mobile ticket to be transmitted from a first user to a second user, and wherein said electronic mobile ticket is encrypted with a key shared by said first user and said ticketing application system;
   modifying a target receiver of said electronic message in said ticketing application system;
   adding a mobile device number of said second user into said electronic message;
   transmitting said electronic message that includes an encrypted electronic mobile ticket encrypted using a key shared between said second user and said ticketing application system and said mobile device number of said second user to said ticketing application system to allow said ticketing application system to implement a valid transfer of said electronic mobile ticket, wherein said electronic message is transmitted to a mobile device of said second user using a short message service (SMS) with a flag in a message header to indicate said SMS message includes an encrypted electronic mobile ticket;
   transmitting a decryption command via SMS to said mobile device of said second user to decrypt said electronic mobile ticket encrypted using said key shared between said second user and said ticketing application system; and
   in response to said decryption command presenting on said mobile device of said second user said encrypted electronic mobile ticket, based on said flag being found.

5. The method of claim 4, further comprising:
   encrypting said mobile device number of said second user with said key shared by said first user and said ticketing application system.

6. The method of claim 4, further comprising:
   determining whether said electronic message has a plurality of target receivers before said transmission of said electronic message,
   wherein said transmission of said electronic message is performed if said electronic message has said plurality of target receivers.

7. The method of claim 4, further comprising:
   determining whether said electronic mobile ticket has been transmitted to another user before said transmission of said electronic message,
   wherein said transmission of said electronic message is performed if said electronic mobile ticket has not been transmitted to said another user.

8. The method of claim 4, further comprising:
   decrypting a second encrypted electronic mobile ticket; and
   invalidating said decrypted second electronic mobile ticket by adding a flag on said decrypted second electronic mobile ticket.

9. A computer-implemented apparatus for performing a valid transfer of an electronic mobile ticket on a mobile device by a ticketing application system of a ticket processing center, said apparatus comprising:

a computer system with a receiving module for receiving a first electronic message from a first user, wherein said first electronic message includes an encrypted electronic mobile ticket and a mobile device number of a second user, and wherein said electronic mobile ticket is encrypted with a key shared between said first user and said ticketing application system;

a decryption module for decrypting said encrypted electronic mobile ticket; a generation module for generating an electronic mobile ticket encrypted with a key shared by said ticketing application system and said second user;

a transmission module for transmitting a second electronic message that includes said electronic mobile ticket encrypted with said key shared between said ticketing application system and said second user to a mobile device of said second user, wherein said second electronic message is transmitted using a short message service (SMS) with a flag in a message header to indicate said SMS message includes an encrypted electronic mobile ticket;

transmitting a decryption command via SMS to said mobile device of said second user to decrypt said electronic mobile ticket encrypted using said key shared between said second user and said ticketing application system; and in response to said decryption command presenting on said mobile device of said second user said encrypted electronic mobile ticket, based on said flag being found.

10. The apparatus of claim 9, further comprising:
a validation module for validating said decrypted electronic mobile ticket by checking a status information of an issued ticket.

11. The apparatus of claim 9, further comprising:
a locking module for locking said encrypted electronic mobile ticket included in said first electronic message to forbid the use of said encrypted electronic mobile ticket.

12. The apparatus of claim 9, further comprising:
an invalidation module for setting a status of said encrypted electronic mobile ticket included in said first electronic message from said first user as invalid, wherein setting the status of said encrypted electronic mobile ticket is performed after receiving an electronic message receipt from said mobile device of said second user.

13. A computer-implemented apparatus for performing a valid transfer of an electronic mobile ticket on a mobile device by a ticketing application system of a ticket processing center, said apparatus comprising:

a computer system with an acquisition module for acquiring an electronic message, wherein said electronic message includes an encrypted electronic mobile ticket to be transmitted from a first user to a second user, and wherein said electronic mobile ticket is encrypted with a key shared by said first user and said ticketing application system of said ticket processing center;

a modifying module for modifying a target receiver of said electronic message in said ticketing application system;

an editing module for adding a mobile device number of said second user into said electronic message;

a transmission module for transmitting said electronic message that includes an encrypted electronic mobile ticket encrypted using a key shared between said second user and said ticketing application system and said mobile device number of said second user to said ticketing application system to allow the ticketing application system to implement a valid transfer of said electronic mobile ticket, wherein the second message is transmitted using a short message service (SMS) with a flag in a message header to indicate said SMS message includes an encrypted electronic mobile ticket;

transmitting a decryption command via SMS to said mobile device of said second user to decrypt said electronic mobile ticket encrypted using said key shared between said second user and said ticketing application system; and in response to said decryption command presenting on said mobile device of said second user said encrypted electronic mobile ticket, based on said flag being found.

14. The apparatus of claim 13, further comprising:
an encryption module for encrypting said mobile device number of said second user with said key shared by said first user and said ticketing application system of said ticket processing center.

15. The apparatus of claim 13, further comprising:
a checking module for determining whether said electronic message has a plurality of target receivers before said transmission module transmits said electronic message, wherein said transmission module transmits said electronic message if said electronic message has said plurality of target receivers.

16. The apparatus of claim 13, wherein:
said checking module further determines whether said electronic mobile ticket has been transmitted to another user before said transmission module transmits said electronic message, and
said transmission module transmits said electronic message if said electronic mobile ticket has not been transmitted to said another user.

17. The apparatus of claim 13, further comprising:
a decryption module for decrypting a second encrypted electronic mobile ticket; and
an invalidation module for invalidating said decrypted second electronic mobile ticket by adding a flag on said decrypted second electronic mobile ticket.

18. A non-transitory article of manufacture tangibly embodying computer readable instructions which when implemented, causes a computer to carry out the steps of a computer-implemented method for performing a valid transfer of an electronic mobile ticket on a mobile device by a ticketing application system of a ticket processing center according to claim 1.

19. A non-transitory article of manufacture tangibly embodying computer readable instructions which when implemented, causes a computer to carry out the steps of a computer-implemented method for performing a valid transfer of an electronic mobile ticket on a mobile device by a ticketing application system of a ticket processing center according to claim 4.

* * * * *